US012627753B2

(12) United States Patent
Xue et al.

(10) Patent No.: US 12,627,753 B2
(45) Date of Patent: May 12, 2026

(54) ELECTRONIC DEVICE AND SOUND RECORDING METHOD FOR ELECTRONIC DEVICE

(71) Applicant: VIVO MOBILE COMMUNICATION CO., LTD., Dongguan (CN)

(72) Inventors: Chuanjie Xue, Dongguan (CN); Qinlei Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 315 days.

(21) Appl. No.: 18/210,647

(22) Filed: Jun. 15, 2023

(65) Prior Publication Data

US 2024/0040024 A1 Feb. 1, 2024

Related U.S. Application Data

(63) Continuation of application No. PCT/CN2021/137166, filed on Dec. 10, 2021.

(30) Foreign Application Priority Data

Dec. 17, 2020 (CN) ........................ 202011514026.X

(51) Int. Cl.
| | |
|---|---|
| *H04M 1/02* | (2006.01) |
| *G01C 19/32* | (2006.01) |
| *H04M 1/03* | (2006.01) |
| *H04M 1/04* | (2006.01) |
| *H04R 1/08* | (2006.01) |

(52) U.S. Cl.
CPC .......... *H04M 1/0264* (2013.01); *G01C 19/32* (2013.01); *H04M 1/0277* (2013.01); *H04M*

*1/03* (2013.01); *H04M 1/04* (2013.01); *H04R 1/083* (2013.01); *H04R 2499/11* (2013.01)

(58) Field of Classification Search
None
See application file for complete search history.

(56) References Cited

U.S. PATENT DOCUMENTS

| | | | | |
|---|---|---|---|---|
| 2016/0073558 A1* | 3/2016 | Kole et al. | ........... | H05K 9/0052 |
| 2018/0292866 A1 | 10/2018 | Tucker et al. | | |
| 2020/0107095 A1* | 4/2020 | Yen et al. | .............. | H04R 1/083 |

FOREIGN PATENT DOCUMENTS

| | | | | |
|---|---|---|---|---|
| CN | 208434079 U | * | 1/2019 | .............. H04R 1/08 |
| CN | 109451116 A | | 3/2019 | |
| CN | 110351465 A | | 10/2019 | |
| CN | 210670256 U | | 6/2020 | |

(Continued)

OTHER PUBLICATIONS

Choi, Mobile Terminal, Mar. 28, 2014, South Korea, pages all. (Year: 2014).*

(Continued)

*Primary Examiner* — Curtis A Kuntz
(74) *Attorney, Agent, or Firm* — IPX PLLC

(57) ABSTRACT

An electronic device and a sound recording method for the electronic device are provided. The electronic device includes a housing; a camera module, where the camera module is disposed in the housing and includes a movable support, and the movable support is provided with a lens assembly and is movably disposed on the camera module; and a microphone module, where the microphone module is disposed on the movable support.

13 Claims, 4 Drawing Sheets

(56) References Cited

FOREIGN PATENT DOCUMENTS

| | | | |
|---|---|---|---|
| CN | 210807424 | U | 6/2020 |
| CN | 211830943 | U | 10/2020 |
| CN | 111901524 | A | 11/2020 |
| CN | 112492430 | A | 3/2021 |
| JP | 2003259180 | A | 9/2003 |
| WO | 2020244535 | A | 12/2020 |

OTHER PUBLICATIONS

Sato, Microphone attachment Mechanism, Jun. 17, 2013, Japan, pages all (Year: 2013).*

International Search Report issued in corresponding International Application No. PCT/CN2021/137166, mailed Feb. 22, 2022, 4 pages.

First Office Action issued in related Chinese application No. 202011514026.X, Dec. 2, 2022, 6 pages.

Second Office Action issued in related Chinese application No. 202011514026.X, May 27, 2023, 5 pages.

\* cited by examiner

ELECTRONIC DEVICE AND SOUND RECORDING METHOD FOR ELECTRONIC DEVICE

CROSS-REFERENCE TO RELATED APPLICATIONS

This application is a continuation of International Application No. PCT/CN2021/137166, filed on Dec. 10, 2021, which claims priority to Chinese Patent Application No. 202011514026.X, filed on Dec. 17, 2020. The entire contents of each of the above-identified applications are expressly incorporated herein by reference.

TECHNICAL FIELD

This application relates to the technical field of communication devices, and in particular to an electronic device and a sound recording method for the electronic device.

BACKGROUND

Electronic devices such as smart phones are equipped with microphones. The microphones can record sound of shot targets during video recording of the electronic devices.

However, the microphones are all disposed on motherboards and/or auxiliary boards, and the microphones and the electronic devices are disposed to be relatively fastened. The electronic device will shake as a user's hand shakes during video recording. At this time, a position of the microphone changes relative to the electronic device before shaking, so that there is an angle between a sound source and the microphone. This changes an angle at which the sound source enters the microphone, and further affects a recording effect.

SUMMARY

This application provides an electronic device and a sound recording method for the electronic device.

According to a first aspect, an embodiment of this application provides an electronic device, including:

a housing;

a camera module, where the camera module is disposed in the housing and includes a movable support, and the movable support is firmly provided with a lens assembly and is movably disposed on the camera module; and a microphone module, where the microphone module is disposed on the movable support, the housing is provided with a sound guide hole, a direction, facing the outside of the housing, of the sound guide hole is the same as a shooting direction of the camera module, and the sound guide hole is opposite to the microphone module.

According to a second aspect, an embodiment of this application provides a sound recording method for an electronic device, applied to the foregoing electronic device. The electronic device includes a shake detection apparatus. The method includes the following steps:

obtaining a shake parameter of the electronic device detected by the shake detection apparatus; and driving, based on the shake parameter, the movable support to deflect, so that the microphone module moves along with the movable support.

In the embodiments of this application, the microphone module is disposed on the movable support which drives a lens to move, so that the microphone can move, driven by the movable support, along with the lens, eliminating an angle between a sound source and a microphone.

REFERENCE NUMERALS

Figure 1:
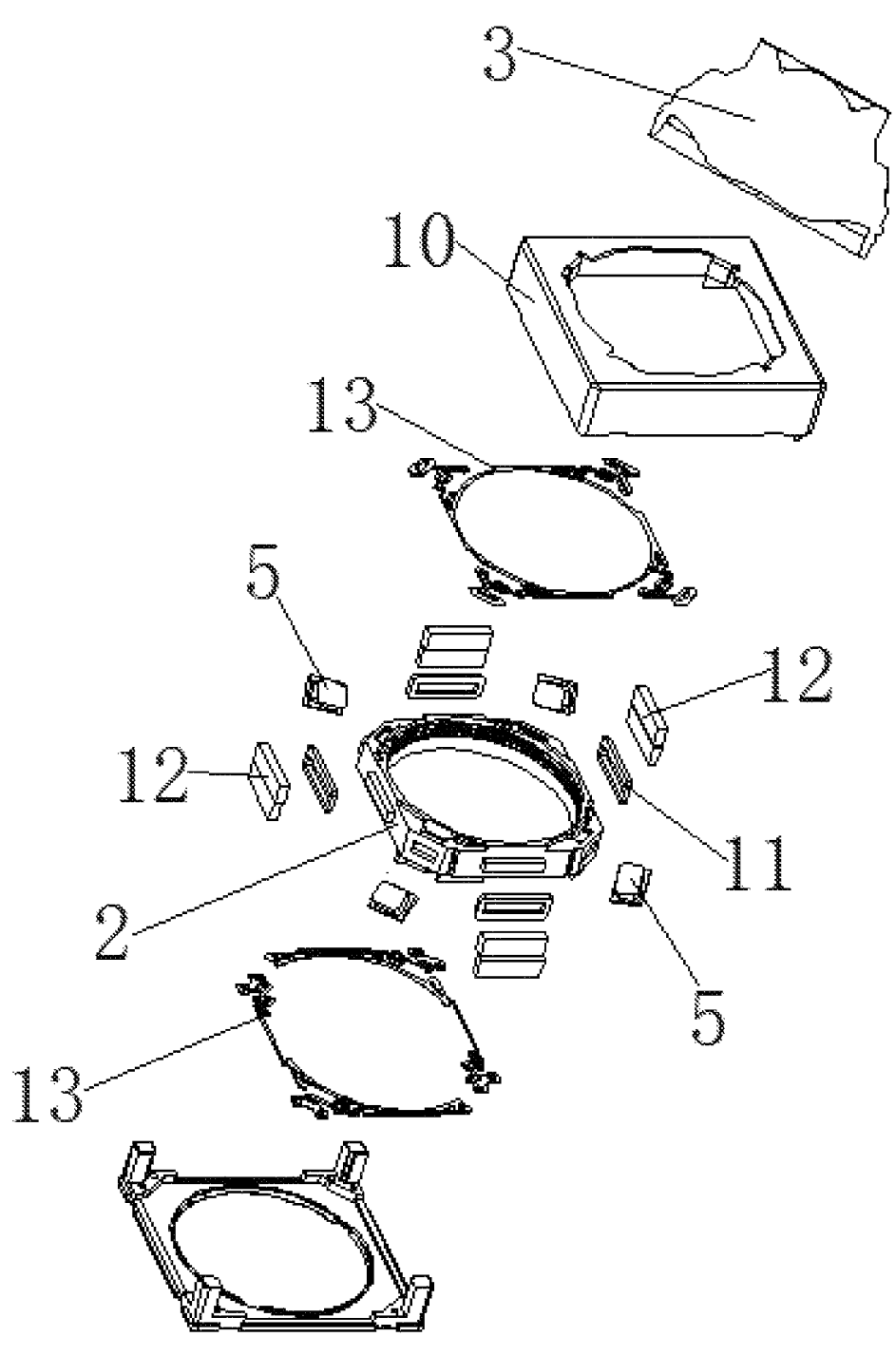
FIG. 1 is an exploded view of an electronic device according to some implementations of this application.

1. Housing; 2. Movable support; 3. Lens; 4. Sound guide hole; 5. Microphone module; 6. Installation groove; 7. Flexible printed circuit board; 8. Camera support; 9. Shielding shell; 10. External housing; 11. Coil; 12. Magnet; 13. Spring plate.

DETAILED DESCRIPTION

Embodiments of this application will be described in detail below. Examples of the embodiments are illustrated in the accompanying drawings, and same or similar reference numerals always indicate same or similar elements or elements having same or similar functions. The embodiments described below with reference to the accompanying drawings are examples, and are intended to only explain this application, but shall not be understood as a limitation on this application. Based on the embodiments of this application, all other embodiments obtained by a person of ordinary skill in the art without creative efforts fall within the protection scope of this application.

Features of terms "first" and "second" in the specification and claims of this application may explicitly or implicitly include one or more of the features. In the descriptions of this application, unless otherwise stated, "a plurality of" means at least two. In addition, in the specification and the claims, "and/or" represents at least one of connected objects, and a character "/" generally represents an "or" relationship between associated objects.

In the description of this application, it should be understood that an orientation or positional relationship indicated by the term "center," "longitudinal," "transverse," "length," "width," "thickness," "upper," "lower," "front," "back," "left," "right," "vertical," "horizontal," "top," "bottom," "internal," "external," "clockwise," "counterclockwise," "axial direction," "radial direction," "circumferential direction," or the like is based on an orientation or positional relationship shown in the accompanying drawings, and is merely for ease of describing this application and simplifying the description, but does not indicate or imply that an apparatus or an element referred to must have a specific orientation or be constructed and operated in a specific orientation, and therefore cannot be understood as a limitation on this application.

In the description of this application, it should be noted that, unless expressly stipulated and defined otherwise, terms "install," "join," "connect," should be understood in a broad sense. For example, "connection" may be a fixed connection, a detachable connection, or an integral connection; may be a mechanical connection, or may be an electrical connection; or may be a direct connection, an indirect connection through an intermediate medium, or a connection between two elements. A person of ordinary skill in the art can understand specific meanings of these terms in this application based on specific situations.

Figure 2:
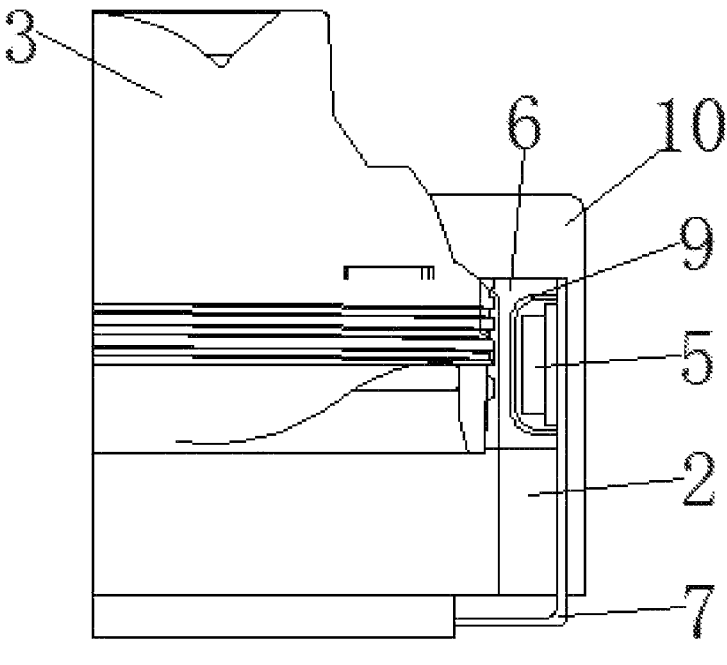
FIG. 2 is a half sectional view of a camera module according to some implementations of this application.
Figure 3:
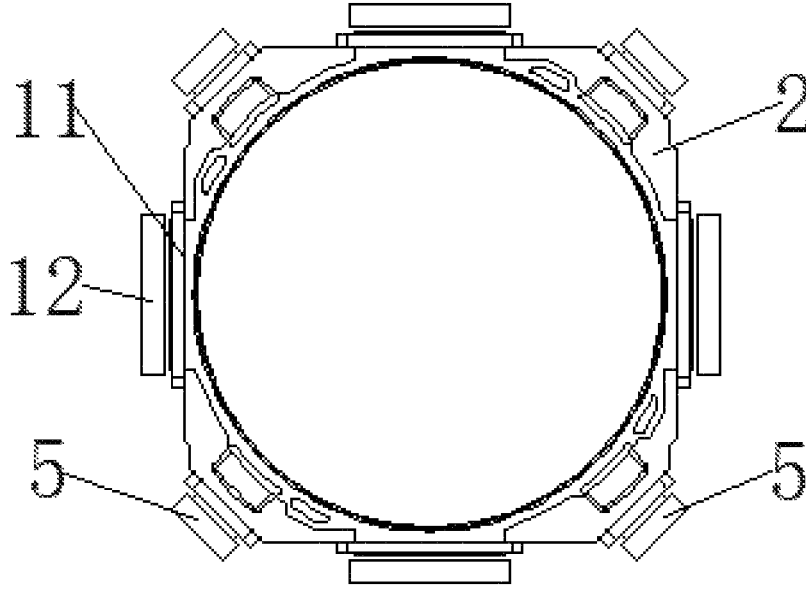
FIG. 3 is a top view of a movable support according to some implementations of this application.
Figure 4:
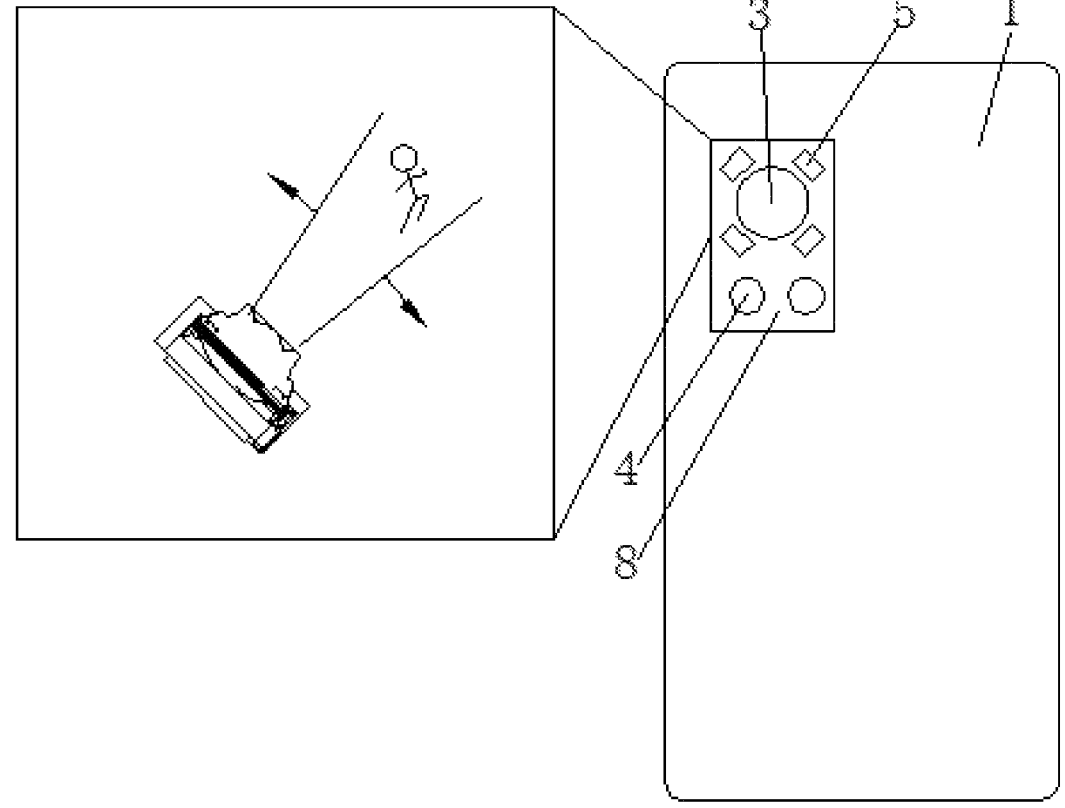
FIG. 4 is a schematic diagram of an installation location of a microphone module of the electronic device according to some implementations of this application.
Figure 5:
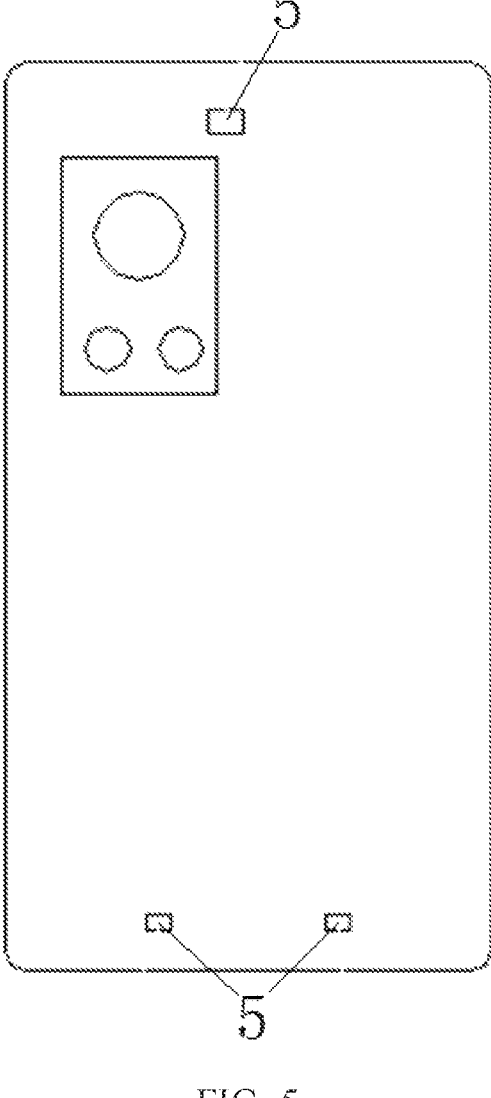
FIG. 5 is a schematic diagram of an installation location of a microphone module according to some implementations of this application.

The following describes an electronic device according to embodiments of this application with reference to FIG. 1 to FIG. 5.

The electronic device according to some embodiments of this application includes a housing 1, a camera module, and a microphone module 5. The housing 1 is an external housing 10 of the electronic device and protects electronic components inside the electronic device. For example, when the electronic device is a mobile phone, the external housing 10 is the housing 1 directly contacted by a user of the mobile phone.

The camera module is disposed in the housing 1, and is an anti-shake camera module. That is, a lens assembly of the camera module can make compensation with the shake of the electronic device held by an operator, so that the camera module can always shoot a clear photo or video. The camera module includes a movable support 2. The movable support 2 is a movable part in the anti-shake camera module. Movement of the movable support 2 is opposite to a shake direction. For example, if the shake direction is upward, the movable support 2 moves downward. The movable support 2 is firmly provided with the lens assembly, so that the lens assembly can move along with the movable support 2. The movable support 2 is movably disposed on the camera module, to achieve functions of anti-shake and focus adjustment for movement of the movable support 2, or achieve only a function of the anti-shake for the movement of the movable support 2 and focus adjustment for the lens assembly of the camera module.

The microphone module 5 is disposed on the movable support 2, so that a microphone is close to the lens assembly and can move along with the moment of the movable support 2. The housing 1 is provided with a sound guide hole 4. A direction, facing the outside of the housing 1, of the sound guide hole 4 is the same as a shooting direction of the camera module, and the sound guide hole 4 is opposite to the microphone module 5. The microphone module 5 receives, through the sound guide hole 4, an audio signal from an object or a person photographed by the camera module.

For the electronic device according to embodiments of this application, the microphone module 5 is disposed on the movable support 2 which drives a lens 3 to move, so that the microphone is disposed close to the lens 3, and the microphone can move, when driven by the movable support 2, along with the lens 3. Further, a sound capturing direction of the microphone module 5 is not changed due to shake. For example, before shake, a shooting direction of the lens assembly points to a shooting target, and the sound capturing direction of the microphone module 5 also points to the shooting target. When or after the electronic device is shaking, the shooting direction of the lens assembly and the sound capturing direction of the microphone module 5 still points to the shooting target as before shake. Therefore, an angle between a sound source and the microphone module 5 is eliminated, making the sound source enter the microphone module 5 at the same angle before and after shake of the electronic device, thereby improving a sound recording effect, and improving the sound recording effect more distinctly especially when shooting a distant view.

Further, the microphone module 5 can be fastened to the movable support 2 by inlaying, adhering, welding, or the like, so that the microphone module 5 can be reliably fastened to the movable support 2, ensuring that the microphone module 5 can move along with the movable support 2 and improving the sound recording effect of the microphone module 5.

In some implementations, a quantity of the microphone modules 5 is at least three, and all the microphone modules 5 are arranged on the movable support 2 at intervals. Each microphone module 5 can receive an audio signal, and each microphone module 5 is separated from each other by a distance, so that the microphone modules 5 can record a shooting target in multiple directions, and the sound recording effect of the microphone modules 5 can be improved. In addition, when there is a failure in one of the microphone modules 5, remaining microphone modules 5 can be used for sound recording, preventing a risk that the electronic device cannot be used normally when only one microphone module 5 is disposed and damaged.

In some implementations, the microphone modules 5 are disposed along a circumferential direction of a side wall of the movable support 2. Because a shooting direction of the lens assembly of the camera module of the electronic device is usually perpendicular to a plane in which the electronic device is located, that is, the camera module is disposed along a thickness direction of the electronic device, the camera module is successively provided with the lens assembly, the movable support 2, a base, and other components from outside to inside. Disposing the microphone modules 5 on the side wall of the movable support 2 can reduce a size of the camera module occupied in the thickness direction of the electronic device as a whole and ensure the sound recording effect of the microphone modules 5 on the premise of ensuring thinness of the electronic device.

The microphone module 5 can also be disposed on an upper side of the movable support 2, to ensure the sound recording effect of the microphone module 5 as well. Compared with that the microphone module 5 is disposed on the side wall of the movable support 2, a thickness of the electronic device is increased, which cannot ensure a small thinness of the electronic device.

Further, all the microphone modules 5 are uniformly disposed in the circumferential direction of the side wall of the movable support 2. Therefore, when the camera module drives the movable support 2 to move, it can be ensured that the center of gravity of the movable support 2 is stable, and it can be prevented that the movable support 2 is deflected and then stuck during movement, causing a failure in use of the anti-shake function.

In some implementations, the movable support 2 is provided with an installation groove 6, and the microphone module 5 is disposed in the installation groove 6. Therefore, an overall volume of the movable support 2 provided with the microphone module 5 can be reduced, saving internal space of the electronic device, increasing an integration level, and overall weight of the movable support 2 can be reduced, facilitating the camera module to drive the movable support 2 and reducing power consumption for driving the movable support 2.

In some implementations, the electronic device further includes a flexible printed circuit board 7. The microphone modules 5 are electrically connected to the flexible printed circuit board 7. The flexible printed circuit board 7 is flexible and can bend and deform along with the movement of the microphone module 5, ensuring power supply to the microphone modules 5 and signal transmission of the microphone modules 5. In addition, the flexible printed circuit board 7 can be electrically connected to an image sensor and/or a motor of the camera module simultaneously, to supply power to achieve signal transmission of the image sensor and/or motor of the camera module.

Further, an inflexible circuit board is disposed under the camera module. The inflexible circuit board may be a motherboard or the like in electronic device. The flexible printed circuit board 7 extending from the circuit board can ensure reliability of electrical connection and achieve power supply and signal transmission.

In some implementations, the housing 1 includes a camera support 8, and the sound guide hole 4 is disposed in the camera support 8. Because the camera module is disposed behind the camera support 8, the lens assembly of the camera module is opposite to the camera support 8, and the lens assembly collects light through an opening on the camera support 8. The sound guide hole 4 is disposed in the camera support 8. Therefore, it can be ensured that the sound guide hole 4 is close to the lens assembly and adjacent to the microphone module 5, and a better sound recording effect can be ensured. In addition, disposing the sound guide hole 4 is in the camera support 8 can simplify a processing technology, and the sound guide hole 4 can be simultaneously provided when the opening of the lens assembly is manufactured.

In some implementations, a shielding shell 9 is installed outside the microphone modules 5. The shielding shell 9 can prevent a microphone magnetic field from interfering with a camera and an external magnetic field from interfering with a microphone. To concentrate a stray magnetic field on a body 1 of the shielding shell 9, the shielding shell 9 should have magnetic permeability as high as possible.

In some implementations, the shielding shell 9 is made of electromagnetic pure iron, permalloy, or ferritic stainless steel, all of which have relatively high magnetic permeability. Further, the shielding shell 9 should be selected after comprehensive consideration of magnetic shield requirements, a price, strength, and processability of the housing 1.

In some implementations, the sound guide hole 4 is provided with a dust-proof element. The dust-proof element can prevent dust from entering the inside of the electronic device, and ensure that the inside of the electronic device is clean, to enable the electronic device to work normally.

In some implementations, the camera module further includes the external housing 10, a coil 11, and a magnet 12. The magnet 12 is disposed on the external housing 10. The magnet 12 and the coil 11 are disposed opposite to each other on the movable support 2. After the coil 11 is electrified, a magnetic field is generated. The magnetic field interacts with a magnetic field of a magnet to generate a driving force, to drive the movable support 2 to move. Further, spring plates 13 are installed at the top and bottom of the movable support 2 and can reset the movable support 2.

When the electronic device according to the embodiments of this application works, the camera module is driven to shoot a picture of an object, a gyroscope senses shake of the electronic device, and the shake is converted to a driving current. The driving current acts on the coil 11 to push the movable support 2 to move, and the movable support 2 drives the lens 3 and the microphone module 5 to move, so that the sound recording direction of the microphone is the same as a direction of a shot object.

For example, the electronic device according to the embodiments of this application may be a mobile electronic device, including but not limited to a mobile phone, a tablet computer, a notebook computer, a palmtop computer, a vehicle-mounted electronic device, a wearable device, an Ultra-Mobile Personal Computer (UMPC), a netbook, a Personal Digital Assistant (PDA), or the like.

This application provides a sound recording method for an electronic device, applied to the foregoing electronic device. The electronic device includes a shake detection apparatus. The method includes the following steps.

Obtain a shake parameter of the electronic device detected by the shake detection apparatus.

The shake detection apparatus is disposed on the electronic device. When the electronic device shakes, the shake detection apparatus can detect the shake parameter of the electronic device. In this case, a processor can collect the shake parameter detected by the shake detection apparatus. For example, when the electronic device is a mobile phone, a camera module of the mobile phone is capturing an image in real time, and a hand of a user holding the mobile phone shakes, the shake detection apparatus can monitor shake and collect a shake parameter in real time. The shake parameter can be obtained by the processor. The shake parameter can also be obtained by the electronic device, or the like.

Drive, based on the shake parameter, the movable support 2 to deflect, so that the microphone module 5 moves along with the movable support 2.

Driving the movable support 2 based on the shake parameter may be that the processor converts the shake parameter to a driving current. As the shake parameter is different, a parameter such as a value of the driving current by conversion is different. The driving current drives a motor to drive the movable support 2 to move, and the movable support 2 drives a lens assembly, to enable a shooting direction of the lens assembly to face a shooting target. The microphone module 5 is disposed on the movable support 2, so that the microphone module 5 and the lens assembly can move synchronously. Therefore, it can be prevented that the lens assembly moves but the microphone module 5 does not move. Further, a sound capturing direction of the microphone module 5 is not changed due to shake. For example, before shake, a shooting direction of the lens assembly points to a shooting target, and the sound capturing direction of the microphone module 5 also points to the shooting target. When or after the electronic device is shaking, the shooting direction of the lens assembly and the sound capturing direction of the microphone module 5 still points to the shooting target as before shake. Therefore, an angle between a sound source and the microphone module 5 is eliminated, making the sound source enter the microphone module 5 at the same angle before and after shake of the electronic device, thereby improving a sound recording effect. The shooting target is an object or image selected by a user and to be shot by the electronic device.

In some implementations, the shake parameter includes a shake direction and shake angle of the electronic device, and driving the movable support 2 based on the shake parameter includes driving the movable support 2 to deflect at the shake angle along a compensation direction. The compensation direction is opposite to the shake direction. For example, if the shake parameter of the electronic device is 3° to the left, the movable support 2 is 3° to the right. The shake direction and the shake angle can be obtained indirectly. For example, the shake detection apparatus can directly output acceleration values of different coordinates, and correspond to the shake direction and the shake angle based on the positive and negative and a value of the acceleration. In addition, the shake parameter may further include a deflection angular velocity and the like.

In some implementations, the shake detection apparatus includes a gyroscope. The gyroscope works stably and can reliably ensure a relative position relationship between the microphone module 5 and a sound source and ensure sound recording quality.

In the description of this specification, descriptions with reference to the term such as "an embodiment," "some embodiments," "exemplary embodiment," "example," "specific example," or "some examples" mean that a specific feature, structure, materia, or characteristic described with reference to the embodiment or example are included in at least one embodiment or example of this application. In this specification, illustrative expressions of these terms do not necessarily refer to the same embodiment or example. Moreover, the specific feature, structure, material, or characteristic described may be combined in any suitable manner in any one or more embodiments or examples.

Although the embodiments of this application have been shown and described, those skilled in the art can understand that a plurality of changes, modifications, substitutions, and variations can be made to these embodiments without departing from the principle and purpose of this application, and the scope of this application is defined by the claims and their equivalents.

The invention claimed is:

1. An electronic device, comprising:
a housing, wherein the housing is provided with a sound guide hole;
a camera module, wherein the camera module is disposed in the housing and comprises a movable support, and the movable support is firmly provided with a lens assembly and is movably disposed on the camera module; and
a microphone module, disposed on the movable support and configured to receive an audio signal through the sound guide hole,
wherein the movable support is configured to drive the lens assembly and the microphone module to move along a shooting direction of the camera module,
wherein the sound guide hole is maintained to be oriented in a same direction as the shooting direction during movement of the movable support, and the sound guide hole is opposite to the microphone module.

2. The electronic device according to claim 1, wherein a quantity of the microphone modules is at least three, and all the microphone modules are arranged on the movable support at intervals.

3. The electronic device according to claim 2, wherein the microphone modules are disposed along a circumferential direction of a side wall of the movable support.

4. The electronic device according to claim 1, wherein the movable support is provided with an installation groove, and the microphone module is disposed in the installation groove.

5. The electronic device according to claim 1, further comprising: a flexible printed circuit board, wherein the microphone module is electrically connected to the flexible printed circuit board.

6. The electronic device according to claim 1, wherein the housing comprises a camera support, and the sound guide hole is disposed in the camera support.

7. The electronic device according to claim 1, wherein a shielding shell is installed outside the microphone module, and the shielding shell is made of at least one of electro-magnetic pure iron, permalloy, or ferritic stainless steel.

8. The electronic device according to claim 1, further comprising:
a magnet set configured to drive the movable support to move along the shooting direction of the camera module.

9. The electronic device according to claim 8, wherein the magnet set comprises:
a magnet; and
a coil, wherein the magnet and the coil are coupled to the movable support.

10. The electronic device according to claim 8, further comprising:
spring plates coupled to a top and a bottom of the movable support and configured to reset the movable support.

11. The electronic device according to claim 8, wherein a quantity of the magnet sets is more than four, and all the magnet sets are disposed along a circumferential direction of a side wall of the movable support.

12. The electronic device according to claim 11, wherein the magnet sets and the microphone modules are alternately arranged around the side wall of the movable support.

13. The electronic device according to claim 1, wherein the sound guide hole is provided with a dust-proof element configured to prevent dust from entering an inside of the electronic device.

* * * * *